United States Patent
Coles et al.

[11] Patent Number: 5,942,155
[45] Date of Patent: Aug. 24, 1999

[54] LIQUID CRYSTAL MATERIAL AND LIQUID CRYSTAL DISPLAY DEVICE USING THE SAME

[75] Inventors: Harry Coles, Highfield, United Kingdom; Kohki Takatoh, Yokohama, Japan; Petra Kloess; Marcus J. Coles, both of Highfield, United Kingdom

[73] Assignee: Kabushiki Kaisha Toshiba, Kawasaki, Japan

[21] Appl. No.: 08/928,025

[22] Filed: Sep. 11, 1997

[30] Foreign Application Priority Data

Sep. 12, 1996 [GB] United Kingdom ............... 9619094

[51] Int. Cl.$^6$ .................... C09K 19/20; C09K 19/12
[52] U.S. Cl. ............... 252/299.64; 252/299.65; 252/299.66; 252/299.67; 428/1
[58] Field of Search ............... 252/299.01, 299.64, 252/299.66, 299.65, 299.67; 428/1

[56] References Cited

FOREIGN PATENT DOCUMENTS 0 599 289  6/1994  European Pat. Off. .

OTHER PUBLICATIONS

P. Kloess, et al., 1–4, Proceedings of the Fifth Int. Conf. On Ferroelectric Liquid Crystals, 1995, Pt 3, pp. 233–243, "Synthesis and Properties of A New Series of Low–Molar–Mass Organosiloxane Derivatives" (Abstract only).
Abstracts of Japan, AN 1990:208087, JP 01268785, Oct. 26, 1989.
CA 127: 212745, 1997.
Petra Kloess, et al., Ferroelectrics, vol. 180, pp. 233–243, "Synthesis and Properties of A New Series of Low–Molar–Mass Organo–Siloxane Derivatives" 1996.
W.K. Robinson, et al., Chemical Abstract 127:212751, Liq. Cryst., vol. 23, No. 2, 1997, "Bi–Mesogenic Organosiloxane Liquid Crystal Materials Exhibiting Antiferroelectric Phases".
W.K. Robinson, et al., Chemical Abstract 127:212745, Liq Cryst., vol. 23, No. 2, 1997, "Structural Characterization of Mono–and Di–Mesogenic Organosiloxanes: The Impact of Siloxane Content on Biphenyl Benzoate Systems".

*Primary Examiner*—Shean C. Wu
*Attorney, Agent, or Firm*—Oblon, Spivak, McClelland, Maier & Neustadt, P.C.

[57] ABSTRACT

The present invention is a liquid crystal including a ferroelectric liquid crystal compound and a siloxane compound represented by the following general formula (I).

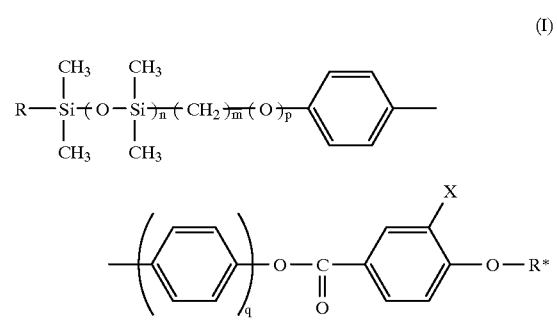

(where m is an integer of 0 to 20, n is an integer of 0 to 8, p is 0 or 1, q is an integer of 0 to 2, R is an alkyl group such as methyl group, ethyl group or propyl group, or an organic residue group represented by the following general formula (II)

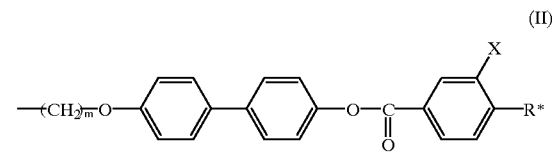

where R* is an alkyl group having optical activity center and X is halogen).

14 Claims, 2 Drawing Sheets

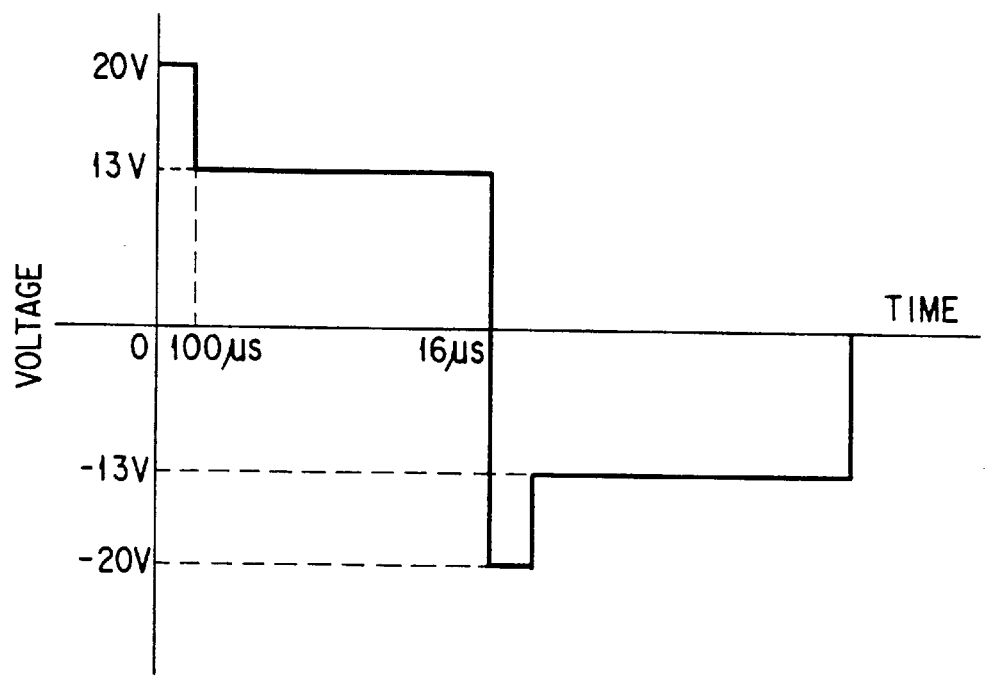
F I G. 1
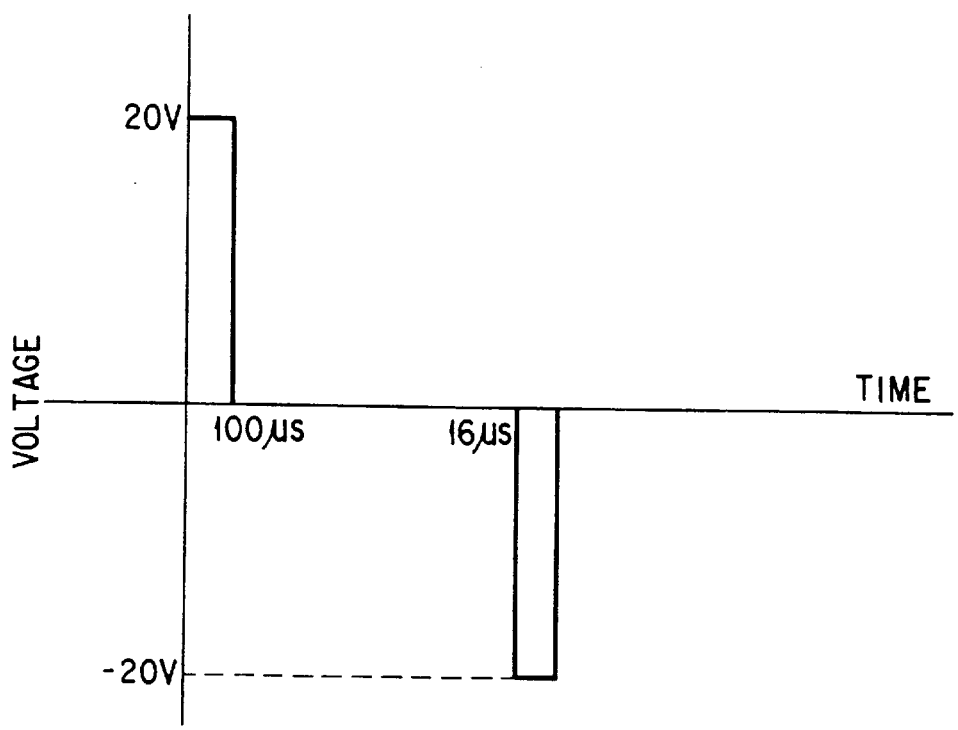
F I G. 2

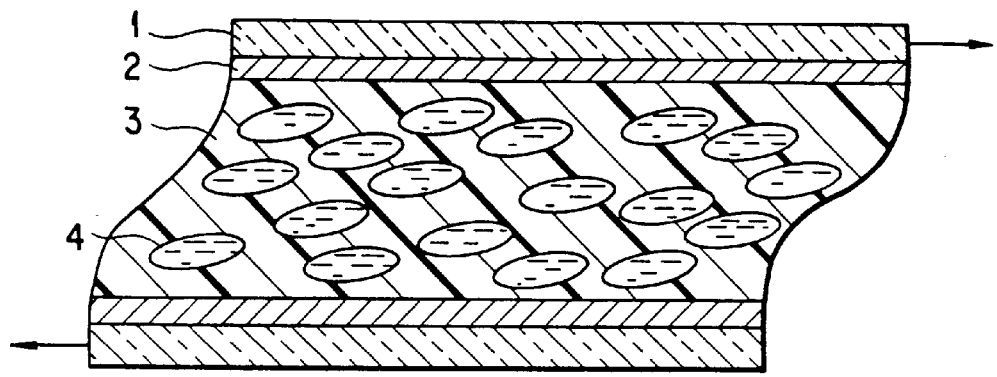
F I G. 3
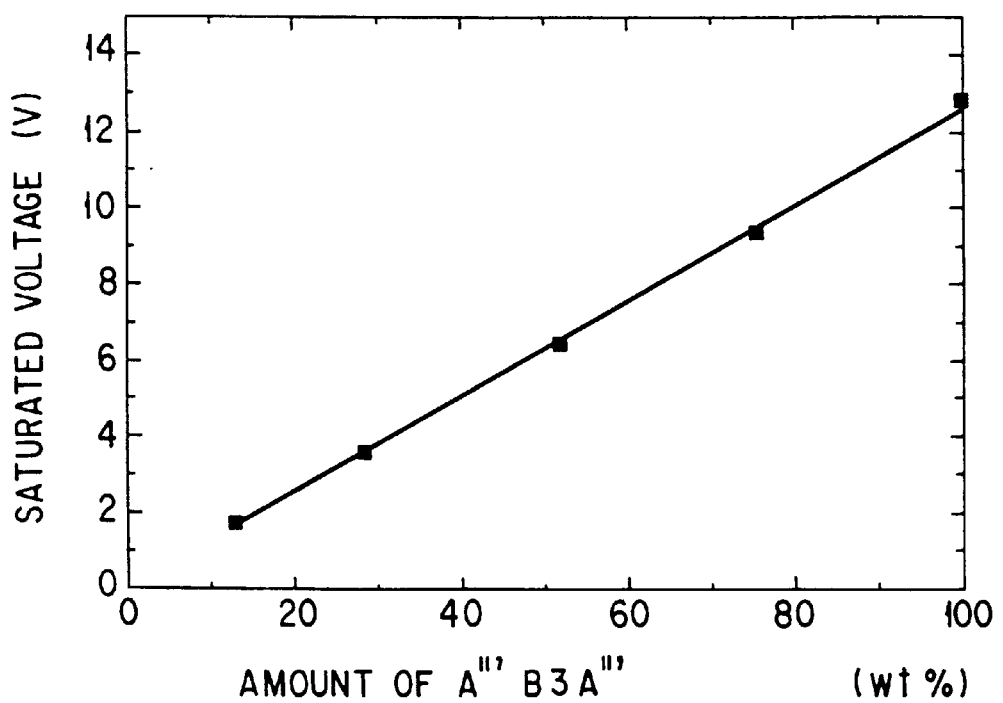
F I G. 4

LIQUID CRYSTAL MATERIAL AND LIQUID CRYSTAL DISPLAY DEVICE USING THE SAME

BACKGROUND OF THE INVENTION

The present invention relates to a liquid crystal material and a liquid crystal display device using the same.

At the present time, a TN type display method of using TN (Twisted Nematic) liquid crystal is most of extensively used for a liquid display device. In recent years, several liquid crystal display modes using ferroelectric liquid crystal or antiferroelectric liquid crystal as a liquid crystal material have been examined in order to attain a faster response speed and a wider viewing angle than the TN liquid crystal.

In a liquid crystal display device using ferroelectric liquid crystal, a double refraction mode, a dichroism mode, and a light scattering mode are mentioned as a switching mode. Among them, a dichroism mode (guest-host method) using a liquid crystal material containing a dichroic dye is a preferable mode in consideration of light utilizing efficiency, since it can manage with one polarizer. However, a large tilt angle (about 45°), suitable in the guest-host mode, is hard to attain in the temperature range (including room temperature) which is practically used. Because of this and some other problems, a ferroelectric liquid crystal which is suitable for a dichroism mode and which can serve to provide a high contrast ratio and a wide viewing angle has not been developed yet.

Also, a liquid crystal display device using ferroelectric liquid crystal has a problem that it is poor in shock resistivity.

In a liquid crystal display device in which antiferroelectric liquid crystal is used, it is desirable to subject the liquid crystal to symmetric driving in which the polarity of voltage applied to the liquid crystal is inverted every frame periods. This is because the symmetric driving serves to prevent display failure known as "burn" which may result from the electric charge accumulated in a limited part of the liquid crystal. However, there has been developed no antiferroelectric liquid crystal which has a large tilt angle (about 45°) suitable for symmetric driving in the practical temperature range (including room temperature) and which can achieve high contrast and a wide viewing angle.

BRIEF SUMMARY OF THE INVENTION

The invention has been done in consideration of such problems, and an object of the invention is to provide a liquid crystal material and a liquid crystal display element using the same which can attain a high contrast ratio and a wide viewing angle. Concretely, the object is to provide a ferroelectric liquid crystal material suitable for a dichroism method, an antiferroelectric liquid crystal material suitable for a symmetric driving method, and a liquid crystal display element excellent in shock resistivity.

The invention provides a liquid crystal material comprising a ferroelectric liquid crystal compound and 1 to 40 wt. % of siloxane liquid crystal compound represented by the following general formula (I):

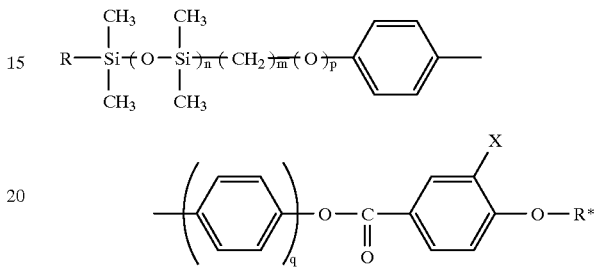

wherein m is an integer of 0 to 20; n is an integer of 0 to 8; p is 0 or 1; q is an integer of 0 to 2; R is alkyl group selected from the group consisting of methyl group, ethyl group and propyl group, or organic residue group represented by the following general formula (II); R* is an alkyl group having optical activity center; and X is halogen.

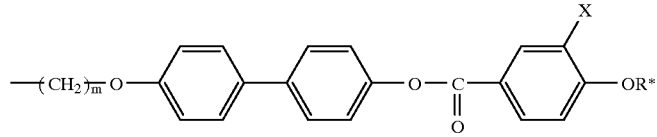

And the invention provides a liquid crystal display device comprising a pair of substrates having an electrode film and a liquid crystal layer interposed between a pair of the substrates which are disposed so that the electrode films face each other, wherein the liquid crystal layer contains a ferroelectric liquid crystal compound and 1 to 40 wt. % of siloxane liquid crystal compound represented by the following general formula (I).

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a figure showing a waveform of a signal voltage applied to a liquid crystal display device using a liquid crystal material (antiferroelectric liquid crystal) of the invention.

FIG. 2 is a figure showing a waveform of a signal voltage applied to a liquid crystal display device using a liquid crystal material (ferroelectric liquid crystal) of the invention.

FIG. 3 is a rough view for showing a liquid crystal display device using a liquid crystal material of the invention.

FIG. 4 is a graph showing a relationship between a content of siloxane liquid crystal compound and a saturation voltage.

DETAILED DESCRIPTION OF THE INVENTION

Embodiments of the invention are concretely described in the following.

A liquid crystal material of the invention contains liquid crystal compound having siloxane groups. Since the compound has siloxane groups, it takes a liquid crystal state in a wider range of temperature (particularly, at low temperatures) than an ordinary liquid crystal material which contains alkyl groups only. And the siloxane liquid crystal compound is low in viscosity so that it may be freely mixed with an ordinary liquid crystal material. Therefore, the siloxane liquid crystal compound can be mixed with an ordinary liquid crystal material to be used. When the siloxane liquid crystal compound is mixed with a ferroelectric liquid crystal compound, very low saturated voltage can be obtained.

Particularly, the content of the siloxane liquid crystal compound is 1 to 40 wt. %, saturated voltage of 5V or lower can be obtained. More preferable content of the siloxane liquid crystal compound is 1 to 20 weight %. If the content of the siloxane liquid crystal compound is less than 1 weight %, the liquid crystal display element operates unstably.

A siloxane liquid crystal compound is determined by a siloxane group of its liquid crystal molecule whether the liquid crystal material is ferroelectric or antiferroelectric. Namely, in the above-mentioned formula (I), in case that n is even (for example, 2 or 4) the liquid crystal material shows ferroelectricity, while in case that n is odd (for example, 3 or 5) it shows antiferroelectricity. However, when n is great enough, it comes to show ferroelectricity.

In the invention, a liquid crystal material showing ferroelectricity gives an optimal tilt angle (45 degrees) by making it, so called, a guest-host liquid crystal containing a dichroic dye. In this way, the invention can provide a liquid crystal display device which can attain a high contrast ratio and a wide viewing angle and can perform switching by a dichroism method. This is because the ferroelectric liquid crystal material of this invention attains a large tilt angle (about 45°) suitable in the guest-host mode, in a wide temperature range within which room temperature falls, and does not having its response sharply decreased in a low temperature range as the ordinary ferroelectric liquid crystal material. Besides a dichroic dye for use in an ordinary guest-host mode, a fluorescent dye, an ultraviolet-absorbing dye and the like can be used in the liquid crystal material. Preferably, the dichroic dye is used in an amount of 0.1 to 10 wt. %, in consideration of the thermal stability required of the ferroelectric liquid crystal material. The dichroic dye in the liquid crystal material serves as a polarizing element, and only one polarizer (e.g., a polarizing plate or the like) is sufficient. This improves the efficiency of using light. In this case, it is desirable to position the polarizer outside one of the two substrates such that the axis of the polarizer is perpendicular to the direction in which the alignment film is aligned. The maximum contrast possible can thereby be obtained.

The antiferroelectric liquid crystal material according to this invention has no tilt angle (45°) in a wide range of temperature because it contains silicone skeleton. Thus, it can work well when subjected to symmetric driving. In symmetric driving a signal voltage of both polarities be applied to the material, thereby preventing ionic impurities to locally exist and preventing display failure known as "burn".

In a display element in which the antiferroelectric liquid crystal material of this invention, it is desirable to arrange the two polarizing plates outside the two substrates, respectively, such that the polarizers of the plates have their axes extending parallel and perpendicular, respectively, to the normal to the antiferroelectric liquid crystal layer. By this, it is possible to obtain the maximum contrast.

A liquid crystal material of the invention can implement a liquid crystal display device excellent in shock resistivity by using a polymer dispersion type liquid crystal. In this case, a polymer matrix contributes to improvement in shock resistivity. This liquid crystal display device is made by dispersing a ferroelectric liquid crystal material (or an antiferroelectric liquid crystal material) into a polymer material prior to hardening, interposing this liquid crystal material between a pair of substrates, and aligning the liquid crystal molecules by applying a shearing stress to the polymer material nearly in parallel with the substrates simultaneously with hardening the polymer material. This liquid crystal display device can improve the shock resistivity as keeping a high-speed response, a wide viewing angle, a half-tone displaying ability, and a memory function which are merits of a ferroelectric liquid crystal material.

In case of using a liquid crystal material of the invention as a polymer dispersion type liquid crystal material, it is desirable to disposed a pair of polarizing plates on the outside of a pair of substrates, make an axis of a polarizer of one polarizing plate parallel with the alignment direction of the polymer dispersion type liquid crystal, and make an axis of a polarizer of the other polarizing plate vertical to the alignment direction of the polymer dispersion type liquid crystal. The maximum contrast possible can thereby be obtained.

A liquid crystal display device of the invention can be applied to an active matrix-driving mode as well as a simple matrix-driving mode. If driven in the active matrix-driving mode using the antiferroelectric liquid crystal material, an antiferroelectric liquid crystal having no a very small hysteresis and having a low threshold voltage is preferable. The antiferroelectric liquid crystal materials or ferroelectric liquid crystal materials, according to the invention, can be used in combination, providing an antiferroelectric liquid crystal material which exhibits no hysteresis and has a low threshold voltage.

Next, embodiments of the invention which has been made in order to clarify effects of the invention are described in the following.

EXAMPLE 1

Firstly, an ITO film (transparent electrode film) having a thickness of 1000 angstrom was formed on the surface of a glass substrate using a sputtering method. Then, a ½ solution obtained by diluting Polyimide Optomer AL 1051 (manufactured by Japan Synthetic Rubber Co., Ltd.) with a diluent ACT608 (manufactured by Japan Synthetic Rubber Co., Ltd.) was applied on the ITO film using a spin coater. This glass substrate was introduced in an oven and subjected a heating/drying treatment at 180° C. for 30 minutes to form a polyimide film (alignment film) having a thickness of 700 angstrom on the ITO film.

Then, the polyimide film was subjected to a rubbing treatment under a normal condition, using a stainless steel roller (having a diameter of 15 cm) fit with a cotton cloth. In such way, two glass substrates having a transparent electrode film and an alignment film were made.

A silica spacer having a particle size of 2μm, Shinsikyu SW (manufactured by Shokubai Kagaku Co., Ltd.) was spread on the whole surface of the polyimide film of one glass substrate made as described above. Then, two glass substrates were arranged so that polyimide films face each other, and two glass substrates were laminated using an epoxy adhesive.

Then, a liquid crystal material (antiferroelectric liquid crystal) represented by the formula AB3A was poured between two glass substrates, and a pair of polarizing plates were further disposed on the outside of two glass substrates to make a simple matrix-driving antiferroelectric liquid crystal display element. Further, an axis of a polarizer of one polarizing plate was parallel to the normal direction of the layer of the antiferroelectric liquid crystal, while an axis of a polarizer of another polarizing plate was vertical to the normal direction of the layer of the antiferroelectric liquid crystal.

A signal voltage shown in FIG. 1 was applied on the transparent electrode film of the resulting liquid crystal display element, and display performances of the liquid crystal display element, i.e. contrast ratio and viewing angle were evaluated. In addition, it was examined whether this liquid crystal display element can display a half tone or not. The contrast ratio was determined by measuring an illuminance of the substrate surface when applying a voltage and when applying no voltage on the liquid crystal display element using an illuminance meter BM-7 (manufactured by Topcon Co.), followed by calculation of ratio thereof. In addition, the viewing angle was determined by rotating the liquid crystal display element in the whole direction and measuring a gradient from the normal of the substrate surface when the contrast ratio becomes 30:1. In addition, the half tone display was examined by confirming the relationship between the applied voltage and the illuminance.

As a result, the contrast was 100:1 and the viewing angle was not less than 60 degrees. In addition, it was possible to display a half tone.

EXAMPLE 2

According to the same manner as that described in Example 1 except for using as the liquid crystal material a mixture of 40% by weight of a compound represented by the formula AB3A, 40% by weight of a compound represented by the formula A'B3A' and 20% by weight of a compound represented by the formula A"B3A" in place of the compound represented by the formula AB3A, a simple matrix-driving antiferroelectric liquid crystal display element was made.

According to the same manner as that described in Example 1, the contrast ratio and viewing angle of the resulting liquid crystal display element were evaluated. In addition, it was examined whether this liquid crystal display element can display a half tone or not. As a result, the contrast ratio was 100:1 and the viewing angle was not less than 60 degrees. In addition, it was possible to display a half tone.

EXAMPLE 3

Firstly, pixels of 240×640 and an active element corresponding to each pixel (This Film Transistor, TFT) were formed on the surface of a glass substrate. The, a ½ solution obtained by diluting Polyimide Optomer AL1051 with a diluent ACT608 was applied on pixels and TFT using a spin coater. This glass substrate was introduced in an oven and subjected to a heating/drying treatment at 180° C. for 30 minutes to form a polyimide film (alignment film) having a thickness of 700 angstrom on the ITO film.

Then, the polyimide film was subjected to a rubbing treatment under a normal condition, using a stainless steel roller (having a diameter of 15 cm) fit with a cotton cloth. In such way, a TFT substrate having pixels, TFT and an alignment film was made.

Then, A RGB color filter corresponding to pixels of the TFT substrate was formed on the surface of the glass substrate, and the resultant was subjected to a flattening treatment. Then, an ITO film (transparent electrode film) having a thickness of 1000 angstrom was formed thereon using a sputtering method, and a polyimide film (alignment film) having a thickness of 700 angstrom was formed on the ITO film. Furthermore, according to the same manner as that described above, the polyimide film was subjected to a rubbing treatment under a normal condition to make a counter substrate having a color filter and an alignment film.

A silica spacer having a particle size of 2 μm, Shinsikyu SW was spread on the whole surface of the polyimide film of the counter substrate made as described above. Then, two glass substrates were arranged so that polyimide films face each other, and two glass substrates were laminated using an epoxy adhesive.

Then, a liquid crystal material (antiferroelectric liquid crystal) represented by the formula AB3A was poured between to glass substrates, and a pair of polarizing plates were disposed on the outside of two glass substrates to make an active matrix-driving antiferroelectric liquid crystal display element. Further, an axis of a polarizer of one polarizing plate was parallel to the normal direction of the layer of the antiferroelectric liquid crystal, while an axis of a polarizer of another polarizing plate was vertical to the normal direction of the layer of the antiferroelectric liquid crystal.

The resulting liquid crystal display element was driven under the condition of 60 Hz (1 flame, 16 ms) and a writing time of 60 μs. At this point, display performances of the liquid crystal display element, i.e. contrast ratio and viewing angle were evaluated. In addition, it was examined whether this liquid crystal display element can display a half tone or not. The contrast ratio and viewing angle were determined according to the same manner as that described in Example 1. In addition, it displays a video-rate image, thereby confirming a half tone display capability.

As a result, the contrast ratio was 100:1 and the viewing angle was not less than 60 degrees. In addition, it was possible to display a half tone.

EXAMPLE 4

According to the same manner as that described in Example 3 except for using as the liquid crystal material a mixture of 40% by weight of a compound represented by the formula AB3A, 40% by weight of a compound represented by the formula A'B3A and 20% by weight of a compound represented by the formula A"B3A" in place of the compound represented by the formula AB3A, an active matrix-driving antiferroelectric liquid crystal display element was made.

According to the same manner as that described in Example 3, the contrast ratio and viewing angle of the resulting liquid crystal display element were evaluated. In addition, it was examined whether this liquid crystal display element can display a half tone or not. As a result, the contrast ratio was 100:1 and the viewing angle was not less than 60 degrees. In addition, it was possible to display a half tone.

EXAMPLE 5

Firstly, an ITO film (transparent electrode film) having thickness of 1000 angstrom was formed on the surface of a glass substrate, using a sputtering method. Then, a ½ solution obtained by diluting Polyimide Optomer AL1051 with a diluent ACT608 was applied on pixels and TFT, using a spin coater. This glass substrate was introduced in an oven and subjected to a heating/drying treatment at 180° C. for 30 minutes to form a polyimide film (alignment film) having a thickness of 700 angstrom on the ITO film.

Then, the polyimide film was subjected to a rubbing treatment under a normal condition, using a stainless steel roller (having a diameter of 15 cm) with a cotton cloth. In such way, two glass substrates having a transparent electrode film and an alignment film were made.

A silica spacer having a particle size of 2 $\mu$m, Shinkikyu SW (manufactured by Shokubai Kagaku Co., Ltd.) was spread on the whole surface of the polyimide film of one glass substrate made as described above. Then, two glass substrates were arranged so that polyimide films face each other, and two glass substrates were laminated using an epoxy adhesive.

Then, a mixture of 96% by weight of a liquid crystal material (ferroelectric liquid crystal) represented by the formula AB3 and 4% weight of a "mauve" dye was poured between two glass substrates, and a polarizing plate was disposed on the outside of one glass substrate to make a guest-host liquid crystal display element. Further, an axis of a polarizer of the polarizing plate was vertical to the direction of the rubbing treatment.

A signal voltage shown in FIG. 2 was applied on the transparent electrode film of the resulting liquid crystal display element. According to the same manner as that described in Example 1, display performances of the liquid crystal display element, i.e. contrast ratio and viewing angle were evaluated.

As a result, the contrast ratio was 100:1 and the viewing angle was not less than 60 degrees.

EXAMPLE 6

According to the same manner as that described in Example 5 except for using as the liquid crystal material a mixture of 35% by weight of a compound represented by the formula AB2, 30% by weight of a compound represented by the formula AB3, 30% by weight of a compound represented by the formula AB4 and 5% by weight of a "manuve" dye in place of the compound represented by the formula AB3, A guest-host liquid crystal display element was made.

According to the same manner as that described in Example 5, the contrast ratio and viewing angle of the resulting liquid crystal display element were evaluated. As a result, the contrast ratio was 100:1 and the viewing angle was not less than 60 degrees.

EXAMPLE 7

A liquid crystal mixture was prepared by mixing 40% by weight of a compound represented by the formula AB3 with 60% by weight of an adhesive NOA65 (manufactured by Norland Optical Co.), and then preserved overnight at a transition point (about 52° C.) of the liquid crystal to an isotropic liquid.

Then, an ITO film (transparent electrode film) having a thickness of 1000 angstrom was formed on the surface of two glass substrates, respectively, using a sputtering method. Then, a spacer having a particle size of 20 $\mu$m was spread on the whole surface of the ITO film of one glass substrate, and two glass substrates were arranged so that ITO films face each other, and fixed so that the relative position of two glass substrates can be transferred.

Then, a liquid crystal mixture was poured into a cell thus prepared and ultraviolet light was irradiated. At the same time, the glass substrate was transferred to a specific direction and a shear stress was applied to the liquid crystal mixture to align the liquid crystal. Furthermore, a pair of polarizing plates were disposed on the outside of two glass substrate, thereby making a polymer dispersion type ferroelectric liquid crystal display element wherein a liquid crystal layer obtained by dispersing a liquid crystal droplet 4 in a polymer 3 is interposed between glass substrates 1 having an ITO film 2, as shown in FIG. 3. Further, an axis of a polarizer of one polarizing plate was parallel to the direction of the shear stress applied while an axis of a polarizer of another polarizing plate was vertical to the shear stress applied.

A signal voltage shown in FIG. 1 was applied on the transparent electrode film of the resulting liquid crystal display element. According to the same manner as that described in Example 1, display performances of the liquid crystal display element, i.e. contrast ratio and viewing angle were evaluated. In addition, the impact resistance of this liquid crystal display element was examined. Further, the impact resistance was evaluated by confirming the display defect in a state of applying 500g-load to a point of the glass substrate.

According to the same manner as that described in Example 1, the contrast ratio and viewing angle of the resulting liquid crystal display element were evaluated. As a result, the contrast ratio was 100:1 and the viewing angle was not less than 60 degrees. With respect to the impact resistance, display defect was not confirmed.

Some of antiferroelectric liquid crystal materials of the invention (for example, represented by a structural formula AB3A) do not show hysteresis as seen in an ordinary antiferroelectric liquid crystal material, but show a phenomenon that its electrooptic response rises with a constant gradient according to an applied voltage of about 0 volt or higher. A liquid crystal display device using an antiferroelectric liquid crystal material showing this phenomenon can be driven by a low voltage and can easily display a half tone by utilizing a gradient of rising. Therefore, such a liquid crystal display device is particularly suitable for active matrix driving. Evaluations as described in the following were performed in order to clarify these features.

EXAMPLE 8

A simple matrix-driving antiferroelectric liquid crystal display device was made according to the same manner as described in Example 1. This antiferroelectric liquid crystal display device was set on the stage of a microscope having a photodetector mounted on an eyepiece and its electrooptic response (characteristic of applied voltage vs. optical transparency) was observed. Concretely, the electrooptic response was observed as applying a 1-Hz, triangular-wave voltage of −10 to 10 volts between the substrates of the antiferroelectric liquid crystal display device.

As a result, a hysteresis phenomenon as seen in an ordinary antiferroelectric liquid crystal display device was not observed, but a V-shaped response characteristic showing a response having a constant gradient in a low-voltage range was observed. An applied voltage corresponding to a transparency change of 10% was 0.96 volt and an applied voltage corresponding to a transparency change of 90% was 3.1 volts, and so it was confirmed that this display device can be driven by a lower voltage than an ordinary antiferroelectric liquid crystal display device.

EXAMPLE 9

A cell was made according to the same manner as described in Example 3 and a liquid crystal material using in Example 8 in an isotropic-liquid state was injected into the cell, and then the cell was slowly cooled down to the room temperature. An active matrix-driving antiferroelectric liquid crystal display device was made by disposing a pair of polarizing plates on the outside of the cell. Here, axes of polarizers of the polarizing plates were set in the same direction as described in Example 3. In this manner, an active matrix-driving antiferroelectric liquid crystal display device was made.

The resulting antiferroelectric liquid crystal display device was driven by a write signal of 60 Hz (16 ms in one frame period) with a write time of 60 microseconds. Display performances of the display device in this case, namely, contrast ratio and viewing angle were evaluated according to the same manner as described in Example 1. And it was examined whether this liquid crystal display device can display a half toner or not. A half tone display displays a video-rate image, thereby confirming a half tone display capability.

As a result, the contrast ratio was 110:1 and the viewing angle was not less than 60 degrees. And it was found that this liquid crystal display device can display a dynamic image of analog tone and thereby can display a half tone. And a phenomenon that the viewing angle becomes narrow when displaying a video-rate image was not observed. Furthermore, this liquid crystal display device could attain the above-mentioned characteristics with a maximum signal voltage of only 5 volts while Example 3 needed a maximum signal voltage of 20 volts.

EXAMPLE 10

A band-like ITO electrode 1,000 Å thick and 1 cm wide was formed on each of six glass substrates by a sputtering method through a predetermined metal mask. Then, a solution obtained by diluting Polyimide Optomer AL 1051 (manufactured by Japan Synthetic Rubber Co., Ltd.) with a diluent ACT608 (manufactured by Japan Synthetic Rubber Co., Ltd.) was applied on the ITO electrode using a spin coater. The resultant glass substrate was introduced into an oven and subjected to a heating/drying treatment at 180° C. for 30 minutes to form a polyimide film (alignment film) having a thickness of 700 Å on the ITO electrode.

Then, the polyimide film was subjected to a rubbing treatment under a normal condition, using a stainless steel roller having a diameter of 15 cm and fit with a cotton cloth. In such way, six glass substrates each having a transparent electrode and an alignment film formed on the surface were prepared.

A silica spacer having a particle size of 2 μm, i.e., Shinsikyu SW (manufactured by Shokubai Kagaku Co., Ltd.), was spread on the entire surface of each of three glass substrates selected from the six glass substrates prepared as above. Then, one of the glass substrates having the silica spacer spread thereon was superposed on one of the glass substrates not having the silica powder spread thereon such that the polyimide films faced each other, followed by bonding these two glass substrates with an epoxy adhesive. In this fashion, prepared were three liquid crystal cells each having a plurality of regions sandwiched between the upper and lower electrodes each having a width of 1 cm.

Liquid crystal compositions (1) to (3) given below were injected into these liquid crystal cells:

(1) A composition consisting of 13% by weight of the compound represented by structural formula A'''B3A''' and 87% by weight of the compound represented by structural formula A'''B3.

(2) A composition consisting of 28% by weight of the compound represented by structural formula A'''B3A''' and 72% by weight of the compound represented by structural formula A'''B3.

(3) A composition consisting of 75% by weight of the compound represented by structural formula A'''B3A''' and 25% by weight of the compound represented by structural formula A'''B3.

Then, a pair of polarizing plates were further disposed on the outside of the two glass substrates to obtain a simple matrix-driving antiferroelectric liquid crystal display element. An axis of a polarizer of one polarizing plate was parallel to the normal direction of the layer of the antiferroelectric liquid crystal, while an axis of a polarizer of another polarizing plate was perpendicular to the normal direction of the layer of the antiferroelectric liquid crystal.

All of the liquid crystal compositions and liquid crystal materials given above were found to exhibit antiferroelectric properties.

A triangular wave voltage having a frequency of 1 Hz and an amplitude of ±15V was applied across one electrode portion of the liquid crystal element thus prepared so as to measure a saturation voltage $V_{sat}$. FIG. 4 shows the result. As apparent from FIG. 4, the saturation voltage $V_{sat}$ was 5V or less when the liquid crystal composition contained 40% by weight or less of the compound represented by the structural formula A'''B3A''', making it possible to drive the element with a low driving voltage.

EXAMPLE 11

Each of a TFT liquid crystal element using the liquid crystal composition (1) prepared in Example 10 and another TFT liquid crystal element using only the liquid crystal compound represented by the structural formula A'''B3A''' was driven at 5V as in Example 3. The TFT liquid crystal element using the composition (1) was found to exhibit a contrast of 70:1. On the other hand, the TFT liquid crystal element using the liquid crystal compound represented by the structural formula A'''B3A''' was found to exhibit a contrast of 10:1. Clearly, the TFT liquid crystal element using the composition (1) of two different liquid crystal compounds exhibits a markedly high contrast.

As described above, the invention can provide a ferroelectric liquid crystal material making possible a dichroic switching operation and an antiferroelectric liquid crystal material suitable for symmetric driving, and can implement a liquid crystal display device having a high contrast ratio and a wide viewing angle by using these liquid crystal materials.

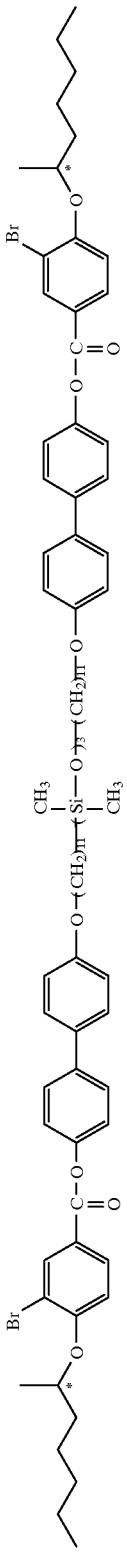
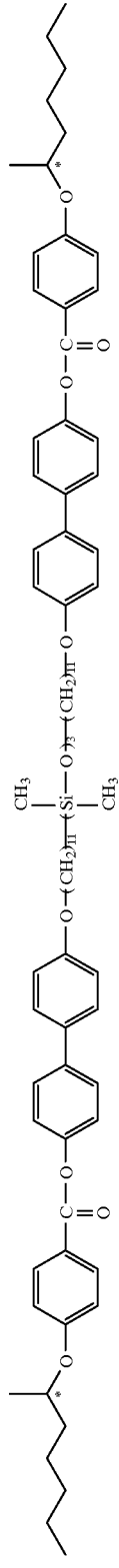
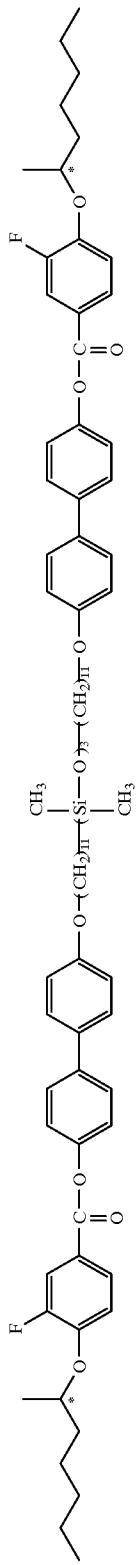
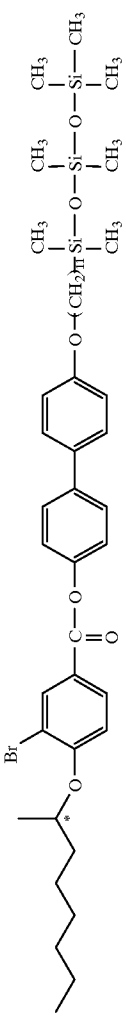

-continued
formula AB2
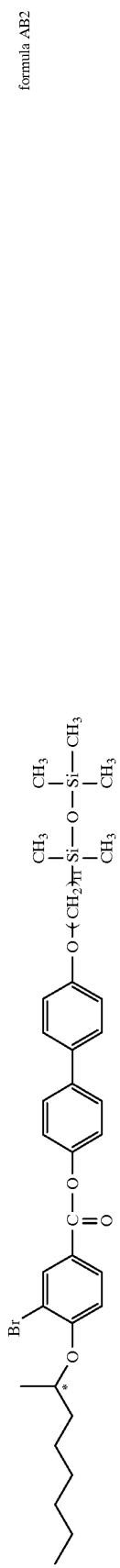
formula AB4
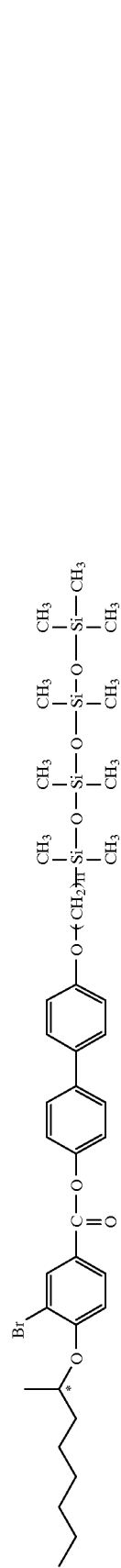
formula A'''B3A''
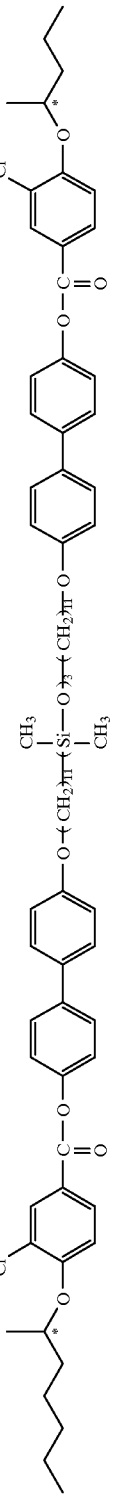
formula A'''B3
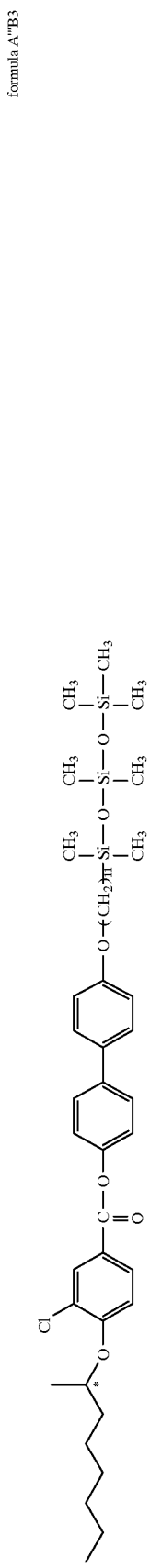

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

We claim:

1. A liquid crystal material comprising a ferroelectric liquid crystal compound and 1 to 40 wt. % of an antiferroelectric siloxane liquid crystal compound represented by the following general formula (I):

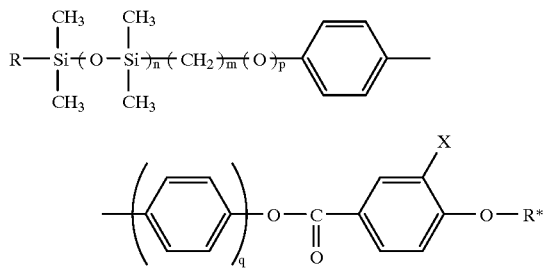

(I)

wherein m is an integer of 0 to 20; n is an odd integer of 0 to 8; p is 0 or 1; q is an integer of 0 to 2; R is an organic residue group represented by the following general formula (II):

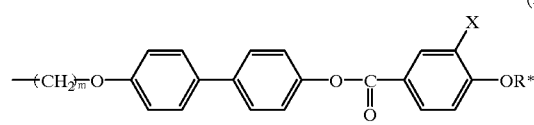

(II)

R* is an alkyl group having an optical activity center; and X is halogen.

2. A liquid crystal material according to claim 1, wherein said siloxane liquid crystal compound is contained in an amount of 1 to 20 wt. %.

3. A liquid crystal material according to claim 1, wherein said ferroelectric liquid crystal compound is represented by the following general formula (I).

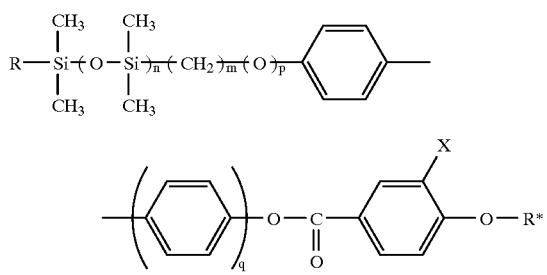

(I)

wherein m is an integer of 0 to 20; n is an integer of 0 to 8 and the value of n maintains the compound as a ferrelectric liquid crystal; p is 0 or 1; q is an integer of 0 to 2; R is alkyl group selected from the group consisting of methyl group, ethyl group and propyl group; R* is an alkyl group having optical activity center; and X is halogen.

4. A liquid crystal display element comprising a pair of substrates having an electrode film and a liquid crystal layer interposed between a pair of the substrates which are disposed so that the electrode films face each other, the liquid crystal layer containing a ferroelectric liquid crystal compound and 1 to 40 wt. % of an antiferroelectric siloxane liquid crystal compound represented by the following general formula (I):

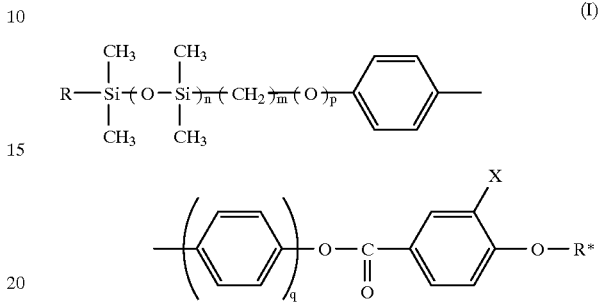

(I)

wherein m is an integer of 0 to 20; n is an odd integer of 0 to 8; p is 0 or 1; q is an integer of 0 to 2; R is an organic residue group represented by the following general formula (II):

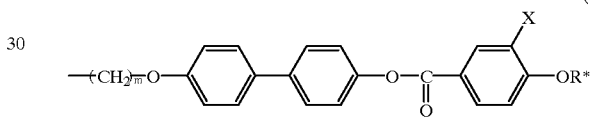

(II)

R* is an alkyl group having an optical activity center; and X is halogen.

5. An element according to claim 4, wherein a pair of polarizing plates are disposed on the outside of a pair of the substrates, and an axis of a polarizer of one polarizing plate is parallel to the normal direction of the layer of the antiferroelectric liquid crystal, while an axis of a polarizer of another polarizing plate is vertical to the normal direction of the layer of the antiferroelectric liquid crystal.

6. An element according to claim 4, which is a simple matrix driving.

7. An element according to claim 4, which is an active matrix driving.

8. An element according to claim 4, wherein an alignment film is formed on the electrode film.

9. An element according to claim 4, wherein the liquid crystal material is a guest-host liquid crystal containing a ferroelectric liquid crystal and a dye or dyes.

10. An element according to claim 9, wherein an alignment film is formed on the electrode film, a polarizing plate is disposed on the outside of one substrate of a pair of the substrates.

11. An element according to claim 4, wherein the liquid crystal material is polymer dispersion type liquid crystal obtained by dispersing a ferroelectric liquid crystal in a polymer.

12. An element according to claim 11, wherein said polymer dispersion type liquid crystal contains a dye or dyes.

13. An element according to claim 11, wherein the polymer dispersion type liquid crystal is aligned.

14. An element according to claim 13, wherein a pair of polarizing plates are disposed on the outside of a pair of the substrates, and an axis of a polarizer of one polarizing plate is parallel to the alignment direction of the polymer dispersion type liquid crystal, while an axis of a polarizer of another polarizing plate is vertical to the alignment direction of the polymer dispersion type liquid crystal.

* * * * *